C. W. SWINGLE.
FLASH LIGHT.
APPLICATION FILED MAY 7, 1920.

1,422,239.

Patented July 11, 1922.
3 SHEETS—SHEET 1.

Edwin G. McKee
WITNESS

C. W. Swingle INVENTOR
BY Victor J. Evans
ATTORNEY

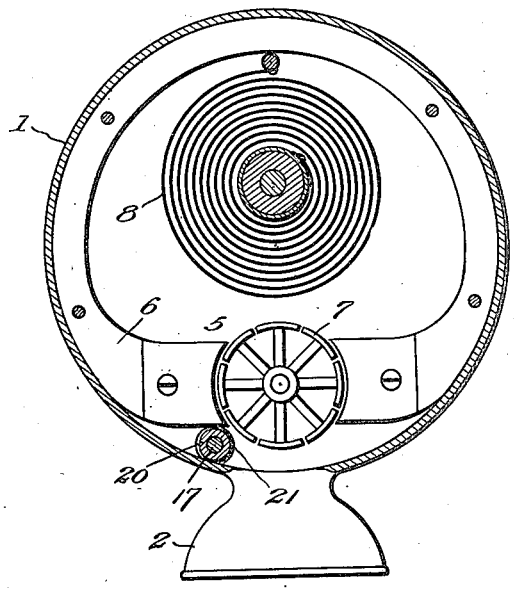
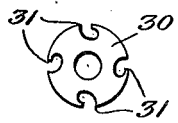
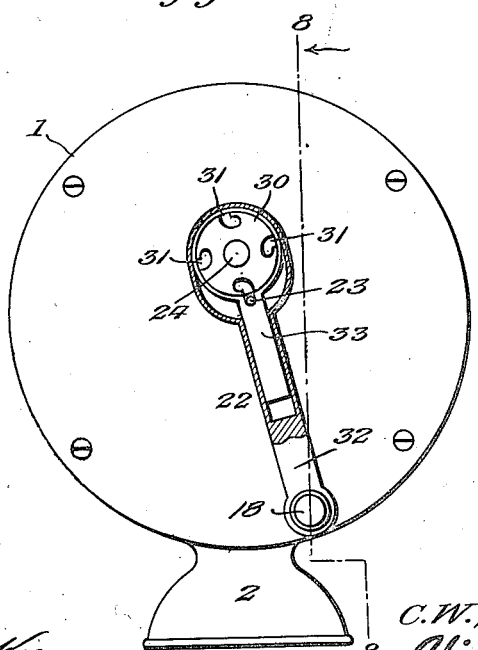
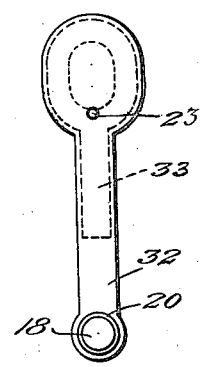

C. W. SWINGLE.
FLASH LIGHT.
APPLICATION FILED MAY 7, 1920.

1,422,239.

Patented July 11, 1922.
3 SHEETS—SHEET 3.

C. W. Swingle INVENTOR

BY

ATTORNEY

WITNESS:

UNITED STATES PATENT OFFICE.

CHARLES W. SWINGLE, OF CHICAGO, ILLINOIS.

FLASH LIGHT.

1,422,239.   Specification of Letters Patent.   Patented July 11, 1922.

Application filed May 7, 1920. Serial No. 379,627.

*To all whom it may concern:*

Be it known that I, CHARLES W. SWINGLE, a citizen of the United States, residing at Chicago, in the county of Cook and State of Illinois, have invented new and useful Improvements in Flash Lights, of which the following is a specification.

This invention relates to a flash light and has for its primary object the construction of a flash light mechanically operated and under the control of the user.

An object of the invention is the arrangement and association of parts so as to accomplish a compact arrangement capable of driving a current generator at the required speed to illuminate the electric bulb.

An object of the invention is to provide simple, substantial parts so associated that the bulb may be flashed at required intervals and the prime mover, in this particular case, a coil spring may be quickly re-tensioned.

With these and other objects in view the invention will be better understood from the following detailed description taken in connection with the accompanying drawings wherein:

Fig. 3 is a sectional view illustrating the position of the coil spring and generator.

Fig. 4 is a sectional view illustrating the ratchet connection of the lever.

Fig. 5 is a plan view of the ratchet.

Fig. 6 is a plan view of one of the parts of the lever.

Fig. 7 is a plan view of the lever.

Figure 1:
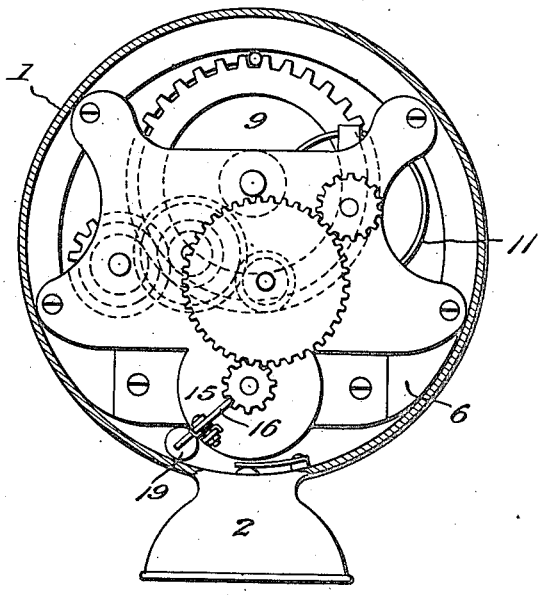
Fig. 1 is a sectional view through the casing showing the mechanism in elevation.
Figure 2:
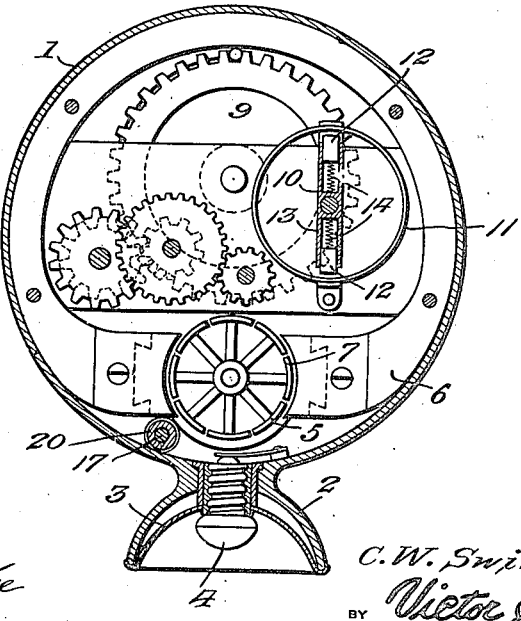
Fig. 2 is a similar view showing the interior mechanism in section.
Figure 8:
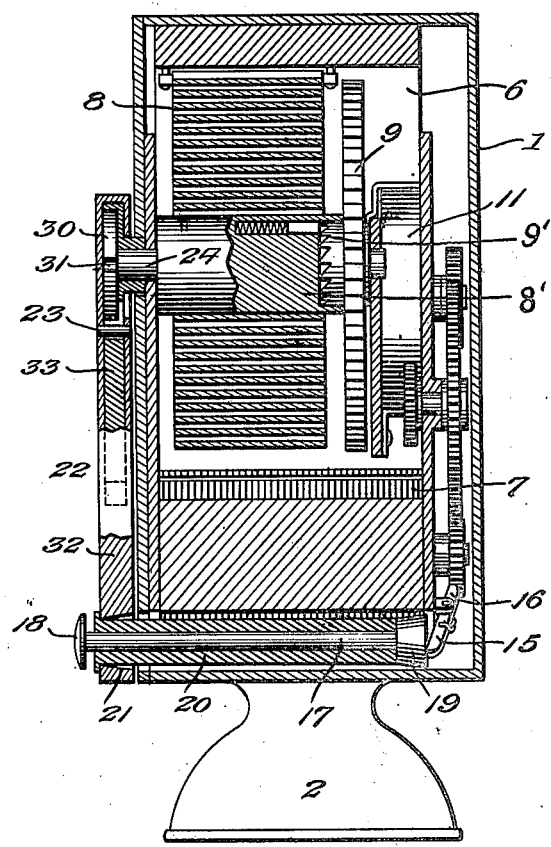
Fig. 8 is an enlarged sectional view through the mechanism.
Figure 9:
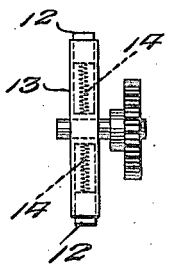
Fig. 9 is a detailed view of the speed retarding device.

Again referring to the drawing illustrating one construction of my invention the numeral 1 designates a casing having an extension 2 supporting a reflector 3. Supported by the casing with relation to the reflector 3 is an electric bulb 4 that is arranged in circuit in any suitable manner with the current generator 5. This current generator in this particular instance consists of a permanent magnet 6 secured to the interior of the casing and co-acting with the armature 7. This armature is driven by the coil spring 8 through the gear connection 9. A ratchet structure 9' is provided for connecting the gear 9 with the shaft 8' to which the spring 8 is connected. At this point I wish to call attention to the fact that any suitable number of gears may be used and of any required shape or proportion. Connected to the gears is a retarding device 10, shown in this particular instance as consisting of a fixed ring 11, the interior peripheral surface of which co-operates with the weights 12 which are mounted for radial movement in the barrel 13. Springs 14 normally retract the weights out of engagement with the ring but upon the speed of the gears reaching a certain degree the centrifugal force will throw the weights into engagement with the ring for preventing any further increasing in speed. Co-operating with one of the gears of the gear mechanism is a releasing device 15, manually operated, for controlling the rotation of the gears. This device consists of a catch 16 spring pressed into engagement with the teeth of one of the gears. This catch is operated by the rod 17 that has one end formed into a finger piece 18 and the other end formed into a tapering head 19 for the purpose hereinafter described. This rod is slidably mounted in the tube 20 which in turn is slidably mounted in a tapering hole 21 in a two part lever 22. From this construction it will be seen that when pressure is brought to bear upon the finger piece 18 the head 19 will displace the catch for releasing the gear so that the spring may drive the generator and thereby illuminate the bulb 4. When relieving the head 18 of pressure the spring compressed catch will return to normal position for preventing further movement of the gears. By pulling on the finger piece 18 the tube will be slid through the hole 21 so that the rod and tube may act as a handle for turning the lever 22. As shown in Fig. 8 there is a ratchet connection 23 between the spring and gear mechanism so that the spring may be re-tensioned at the proper intervals. This ratchet connection includes a shaft 24 to which is connected a disc 30 provided with notches 31 for the purpose now to be described. The lever 22 consists of two parts the main part 32 and an auxiliary part 33. The part 33 is journaled on the shaft 29 and freely supports the disc 30 and slidably supports the part 32 so that the pin 23, carried by the latter, may move into engagement with one of the notches so that the spring may be retensioned. In concluding my description I wish to call attention to the fact that the various parts may be constructed in various other manners and associated in other relations and besides various other combinations may be used for driving the generator and control such operation, therefore I do not desire to be limited in any manner except as set forth in the claims hereunto appended.

Having thus described my invention what I claim is:

1. A flash light comprising a casing, an electric bulb therein, a current generator within the casing and in circuit with the bulb, gears for driving said generator, operating means for said gears, a catch for preventing rotation of said gears, and manually operated means when in one position for releasing said catch and capable when in another position for operating said operating means.

2. A flash light comprising a casing, an electric bulb therein, a current generator within the casing and in circuit with the bulb, a coil spring within said casing, a gear connection between the spring and generator, a catch for controlling operation of the gear, a two part lever having a ratchet connection with the spring, and a rod for operating the catch when in one position and when in another position being adapted to operate said lever.

3. A flash light comprising a casing, an electric bulb therein, a current generator within the casing and in circuit with the bulb, gears for driving said generator, operating means for said gears, a catch for preventing rotation of said gears, and manually operated means when in one position for releasing said catch and capable when in another position for operating said operating means, and a ratchet connection between said gear and operating means.

4. A flash light comprising a casing, an electric bulb supported thereby, a current generator within the casing in circuit with the bulb, gears for driving the generator, a spring for operating the gears, a retarding device connected to the gears, manually operated catch for preventing rotation of the gears, and means when in one position for manually releasing the catch and capable when in another position of winding said spring.

5. A flash light comprising a casing having an extension, a reflector supported by the extension, a bulb arranged within the reflector and supported by the casing, a current generator within the casing in circuit with the bulb, a coil spring, a gear connection between the spring and generator, a retarding device connected to said gear, a catch controlling the operation of the gear, a two part lever having a ratchet connection with the spring, and a rod for operating the catch when in one position and when in another position to operate said lever.

In testimony whereof I affix my signature.

CHAS. W. SWINGLE.